United States Patent
Kamine et al.

(10) Patent No.: US 7,258,919 B2
(45) Date of Patent: Aug. 21, 2007

(54) ACRYLIC PRESSURE SENSITIVE ADHESIVE AND PRESSURE SENSITIVE ADHESIVE TAPE

(75) Inventors: Tetsuji Kamine, Amagasaki (JP); Tomoki Toda, Amagasaki (JP); Mikihiko Horioka, Amagasaki (JP); Kazuhisa Uchiyama, Kariya (JP); Masahiro Ito, Kariya (JP); Yasushi Okamoto, Kariya (JP)

(73) Assignees: Sekisui Chemical Co., Ltd., Osaka (JP); Denso Corporation, Aichi (JP)

( * ) Notice: Subject to any disclaimer, the term of this patent is extended or adjusted under 35 U.S.C. 154(b) by 18 days.

(21) Appl. No.: 10/509,733

(22) PCT Filed: Apr. 4, 2003

(86) PCT No.: PCT/JP03/04311

§ 371 (c)(1),
(2), (4) Date: Dec. 28, 2004

(87) PCT Pub. No.: WO03/085060

PCT Pub. Date: Oct. 16, 2003

(65) Prior Publication Data

US 2005/0118413 A1     Jun. 2, 2005

(30) Foreign Application Priority Data

Apr. 4, 2002    (JP) ............................... 2002-102851
Sep. 18, 2002   (JP) ............................... 2002-272225
Feb. 27, 2003   (JP) ............................... 2003-051471

(51) Int. Cl.
    *B32B 17/06*    (2006.01)
(52) U.S. Cl. .............................. 428/355 AC; 428/40.1; 428/343; 428/354; 427/208
(58) Field of Classification Search ................ 428/343, 428/354, 355 AC, 40.1; 427/208
See application file for complete search history.

(56) References Cited

U.S. PATENT DOCUMENTS 5,772,851 A    6/1998   Basf 6,432,529 B1    8/2002   Harder et al.
6,984,413 B2    1/2006   Yamamoto et al.
2002/0161129 A1   10/2002   Husemann et al.

FOREIGN PATENT DOCUMENTS

| CN | 1303899 A | 7/2001 |
|---|---|---|
| EP | 0 899 987 A1 | 3/1999 |
| JP | 2-115291 | 4/1990 |
| JP | 6-122859 | 5/1994 |
| JP | HEI 7-196726 | 8/1995 |
| JP | 8-41436 | 2/1996 |
| JP | 8-41436 A | 2/1996 |
| JP | 9-194798 | 7/1997 |
| JP | 9-194798 A | 7/1997 |
| JP | 10-226775 | 8/1998 |
| JP | 10-226775 A | 8/1998 |
| JP | 11-315260 | 11/1999 |
| JP | 2002-69411 | 3/2002 |
| JP | 2002-69411 A | 3/2002 |
| JP | 2002-309210 | 10/2002 |

*Primary Examiner*—Daniel Zirker
(74) *Attorney, Agent, or Firm*—Sughrue Mion, PLLC

(57) ABSTRACT

The purpose of the present invention is to provide an acrylic pressure sensitive adhesive and a pressure sensitive adhesive tape preferable to be used for adhesion and fixation of members to be used in closed space of such as a vehicle, a housing where odors become a problem; or in the side of electronic appliances where volatile gases become a problem and also relates to a vehicular air conditioner unit produced by using them.

The present invention relates to an acrylic pressure sensitive adhesive, which has 500 ppm or lower of volatile component concentration A calculated by the following equation (1), when the acrylic pressure sensitive adhesive is heated at 90° C. for 30 minutes:

volatile component concentration A (ppm)=volatile component content X (μg)/pressure sensitive adhesive weight Z (g) before heating     (1)

in the equation (1), the volatile component content X is an amount measured by conversion into toluene.

10 Claims, No Drawings ic PRESSURE SENSITIVE
ADHESIVE AND PRESSURE SENSITIVE
ADHESIVE TAPE

TECHNICAL FIELD

The invention relates to an acrylic pressure sensitive adhesive and a pressure sensitive adhesive tape preferable to be used for adhesion and fixation of members to be used in closed space of such as a vehicle, a housing where odors become a problem; or in the inside of electronic appliances where volatile gases become a problem and also relates to a vehicular air conditioner unit produced by using them.

BACKGROUND ART

Double coated tapes to be used for adhesion and fixation of members have been used in a vehicle and a housing as well as in the inside of electronic appliances. However, recently, problems of the use of these pressure sensitive adhesive tapes have been pointed out. For example, there occurs fogging attributed to high boiling point volatile components in glass in an automotive inside or operation failure attributed to high boiling point volatile components and impurities also in members of the inside of electronic appliances in some cases. Accordingly, a pressure sensitive adhesive tape to be used in closed space of vehicles such as automobiles and housings, electronic appliance insides is strongly required to be scarcely odorous and have a low total amount of volatile gases, which are environmental burden substances.

Meanwhile, in Japan, guidelines of decrease of respective interior volatile organic compounds but also decrease of the total of the volatile organic compounds for countermeasures for so-called sick houses in the housing field are issued from Ministry of Health, Labour, and Welfare. Also, German Association of the Automotive Industry (Verband der Automobilindustrie (VDA)) has determined an evaluation method for odors of members to be used for the automotive insides in VDA 270 and also evaluation methods for volatile components in DVA 277 and VDA 278. Further, in order to determine the behavior of the fog attributed to volatile components emitted from members, Deutsches Institut fur Normung has determined in DIN No. 75201. As described, it is required to decrease not only specific volatile substances but also a variety of volatile substances in various fields.

The causes of the volatile gases emitted from a common pressure sensitive adhesive tape may include a remaining solvent, a remaining monomer, a remaining polymerization initiator, a tackifier to be used for improving the pressure sensitive physical properties, and the like. Also, the causes of odors may include volatile gas and the like.

Japanese Kokai Publication Hei-6-122859 discloses a method for obtaining a pressure sensitive adhesive scarcely containing a remaining monomer by polymerizing a monomer having a high molecular weight and a low saturated steam pressure. Further, Japanese Kokai Publication Hei-2-115291 discloses a pressure sensitive adhesive using an acrylic polymer obtained by polymerization of a specific acrylic monomer to lower the odor. On the other hand, Japanese Kokai Publication 2002-69411 discloses a production method for a pressure sensitive adhesive tape comprising a pressure sensitive adhesive obtained by using a high purity acrylic polymer with few volatile components such as a remaining initiator or an unreacted monomer produced at a high polymerization ratio by solution polymerization at a specified reaction temperature using a specified amount of an azo type polymerization initiator. Japanese Kokai Publication 2002-309210 discloses a pressure sensitive adhesive tape at a low gas emission level obtained by block copolymerization. Further, Japanese Kokai Publication Hei-11-315260 discloses a production method for a hot melt type pressure sensitive adhesive tape as an anti-fogging pressure sensitive adhesive tape.

However, even in the case of these pressure sensitive adhesive tapes, there still remains a problem that in the case the tapes are used in closed space in housings, vehicles, the insides of electronic appliances, the odor suppression is insufficient by simply suppressing specific volatile components, so that the odor cannot be decreased to an insensible level. Also, high boiling point volatile components in the case of adding a tackifier are not taken into consideration and therefore, with respect to a common pressure sensitive adhesive containing the tackifier, no satisfactory effect has been achieved by conventional techniques.

SUMMARY OF THE INVENTION

The purpose of the present invention is to provide an acrylic pressure sensitive adhesive and a pressure sensitive adhesive tape preferable to be used for adhesion and fixation of members to be used in closed space of such as a vehicle, a housing where odors become a problem; or in the side of electronic appliances where volatile gases become a problem and also relates to a vehicular air conditioner unit produced by using them.

A first aspect of the present invention provides an acrylic pressure sensitive adhesive, which has 500 ppm or lower of volatile component concentration A calculated by the following equation (1), when the acrylic pressure sensitive adhesive is heated at 90° C. for 30 minutes:

volatile component concentration A (ppm)=volatile component content X (µg)/pressure sensitive adhesive weight Z (g) before heating (1)

in the equation (1), the volatile component content X is an amount measured by conversion into toluene.

A second aspect of the present invention provides an acrylic pressure sensitive adhesive, which has 600 ppm or lower of volatile component concentration B calculated by to the following equation (2), when the acrylic pressure sensitive adhesive is heated at 120° C. for 30 minutes:

volatile component concentration B (ppm)=volatile component content Y (µg)/pressure sensitive adhesive weight Z (g) before heating (2)

in the equation (2), the volatile component content Y is an amount measured by conversion into n-hexadecane.

The acrylic pressure sensitive adhesive of the first aspect of the present invention or second aspect of the present invention preferably contains a tackifier containing 13% by weight or lower of the component with 600 or lower of molecular weight.

The third aspect of the present invention provides a pressure sensitive adhesive tape, which has a pressure sensitive adhesive layer comprising the acrylic pressure sensitive adhesive of the first aspect of the present invention or the second aspect of the present invention, the pressure sensitive adhesive tape having 300 ppm or lower of volatile component concentration C calculated by the following equation (3), when the pressure sensitive adhesive tape is heated at 90° C. for 30 minutes:

volatile component content P (µg)/pressure sensitive adhesive tape weight R (g) before heating (3)

in the equation (3), the volatile component content P is an amount measured by conversion into toluene.

The fourth aspect of the present invention provides a pressure sensitive adhesive tape, which has a pressure sensitive adhesive layer comprising the acrylic pressure sensitive adhesive of the first aspect of the present invention or the second aspect of the present invention, the pressure sensitive adhesive tape having 400 ppm or lower of volatile component concentration D calculated by the following equation (4), when the pressure sensitive adhesive tape is heated at 120° C. for 30 minutes:

$$\text{volatile component concentration D (ppm)}=\text{volatile component content Q (µg)/pressure sensitive adhesive tape weight R (g) before heating} \quad (4)$$

in the equation (4), the volatile component content Q is an amount measured by conversion into n-hexadecane.

Accordingly, a vehicular air conditioner unit which is obtainable by using the pressure sensitive adhesive tapes of the third aspect of the present invention or the fourth aspect of the present invention is also one of the present invention.

DETAILED DISCLOSURE OF THE INVENTION

The invention is described in detail below.

The first aspect of the present invention provides an acrylic pressure sensitive adhesive, which has 500 ppm or lower of volatile component concentration A calculated by the following equation (1), when the acrylic pressure sensitive adhesive is heated at 90° C. for 30 minutes:

$$\text{volatile component concentration A (ppm)}=\text{volatile component content X (µg)/pressure sensitive adhesive weight Z (g) before heating} \quad (1)$$

in the equation (1), the volatile component content X is an amount measured by conversion into toluene.

If the volatile component concentration A is 500 ppm or lower under the above-mentioned condition, no odor problem occurs even if the tape is used in closed space of such as a vehicle and housing.

The above-mentioned volatile component content X can be measured by heating a weighed acrylic pressure sensitive adhesive at 90° C. for 30 minutes using a thermal desorption apparatus (e.g. ATD-400, manufactured by PerkinElmer Inc.) and measuring the volatile component emitted at that time by GC-MS apparatus (e.g. Automass II-15, manufactured by JEOL Ltd.). That is, an accurately weighed acrylic pressure sensitive adhesive of about 20 mg is put in a sample tube (inner diameter about 5 mm, length about 10 cm) and heated at 90° C. while helium gas being circulated at 1.5 mL/min for 30 minutes and the emitted volatile components are collected in a trap tube installed in a thermal desorption apparatus and concentrated and then the trap tube is heated at 280° C. for 10 minutes and introduced into the GC-MS. For GC-MS measurement, a non-polar capillary column (HP-1, manufactured by Agilent Technologies, 0.32 mm×60 m×0.25 µm) is used and the temperature of the column is kept at 40° C. for 4 minutes and then heated to 100° C. at 5° C./min heating rate and further to 320° C. at 10° C./min heating rate and kept at 320° C. for 3 minutes. The MS measurement range is 30 to 400 amu, the He flow rate is 1.5 mL/min, the ionization voltage is 70 eV, the ion source is kept at 230° C., the interface at 250° C., and the transfer line 225° C. The volatile component content can be calculated from the obtained peak surface area by conversion into toluene weight based on an absolute calibration curve produced by using toluene.

With respect to the acrylic pressure sensitive adhesive of the first aspect of the present invention, the total amount of the remaining polymerization initiator detected by the above-mentioned measurement conditions is preferably 30 ppm or lower and the total amount of the acrylic monomer is preferably 50 ppm or lower, and the volatile component content is preferably 50 ppm or lower after 30 minutes or longer retention time. In such cases, odor is further decreased.

The second aspect of the present invention provides an acrylic pressure sensitive adhesive, which has 600 ppm or lower of volatile component concentration B calculated by to the following equation (2), when the acrylic pressure sensitive adhesive is heated at 120° C. for 30 minutes:

$$\text{volatile component concentration B (ppm)}=\text{volatile component content Y (µg)/pressure sensitive adhesive weight Z (g) before heating} \quad (2)$$

in the equation (2), the volatile component content Y is an amount measured by conversion into n-hexadecane.

If the volatile component concentration B is 600 ppm or lower under the above-mentioned condition, not only no odor problem occurs but also the total amount of high boiling point volatile components is a little, so that no fogging problem taken place and even if the tape is used in the inside of an electronic appliance, the tape does not cause a problem.

The above-mentioned volatile component content Y can be measured in the same method as that in the case of the acrylic pressure sensitive adhesive of the first aspect of the present invention. The amount is calculated by keeping the column temperature at 50° C. for 2 minutes, heating to 160° C. at 25° C./min heating rate and then to 300° C. at 10° C./min heating rate and keeping at the temperature for 20 minutes in GC-MS measurement and carrying out calculation from the obtained peak surface area by weight conversion based on an absolute calibration curve produced by using n-hexadecane.

The acrylic pressure sensitive adhesive of the present invention contains an acrylic polymer as a main component. The above-mentioned acrylic polymer is not particularly limited and preferably, for example, a homopolymer of a (meth)acrylic acid ester monomer or a copolymer of the (meth)acrylic acid ester monomer with another vinyl monomer copolymerizable with the monomer.

Examples of the (meth)acrylic acid ester monomer are preferably esters of acrylic acid or methacrylic acid with a primary or a secondary alcohol comprising an alkyl group having 4 to 12 carbon atoms.

Another vinyl monomer copolymerizable with the above-mentioned (meth)acrylic acid ester monomer is used for heightening agglomeration force by modification of the acrylic polymer and for example, those which have high glass transition point (Tg) themselves and increase Tg of the polymer to be obtained and those which contribute to mesh structure formation of polymer molecules by crosslinking reaction of the functional group contained in the molecules of them with an externally added crosslinking agent can be used.

Examples of the above-mentioned vinyl monomers which can increase Tg of the polymer to be obtained are styrene, acrylonitrile, methyl methacrylate, cyclohexyl (meth)acrylate, benzyl (meth)acrylate, N-phenylmaleimide, N-cyclohexylmaleimide, and N-vinylpyrrolidone. Also, examples of the vinyl monomers which contribute to mesh structure formation of polymer molecules by crosslinking reaction of the functional group contained in the molecules with an externally added crosslinking agent are carboxyl-containing monomers such as acrylic acid, methacrylic acid, crotonic acid, maleic acid, itaconic acid, and maleic anhydride; hydroxyl-containing monomers such as 2-hydroxyethyl (meth)acrylate, n-methylolacrylamide; and epoxy-containing monomers such as glycidyl acrylate, and allyl glycidyl ether.

In the case the above-mentioned acrylic polymer is the copolymer of the (meth)acrylic acid ester monomer and another vinyl monomer copolymerizable with the ester monomer, the content of the (meth)acrylic acid ester monomer is preferably 70% by weight or higher in the monomer composition. Also, in the case the vinyl monomer is for increasing Tg of the polymer to be obtained, the content of such a vinyl monomer is preferably 30% by weight or lower. In the case the vinyl monomer is for contributing to mesh structure formation of polymer molecules by crosslinking reaction of the functional group contained in the molecules with an externally added crosslinking agent, the content of such a vinyl monomer may be controlled so as to keep the functional group-containing monomer preferably in a range of 0.1 to 10% by weight, more preferably in a range of 0.05 to 5% by weight.

The above-mentioned acrylic polymer can be obtained by polymerization of the above (meth)acrylic acid ester monomer or copolymerization of a mixture of the above (meth)acrylic acid ester monomer and the vinyl monomer copolymerizable with it. The polymerization method is not particularly limited and conventionally known polymerization methods, for example, a solution polymerization (boiling point polymerization, below boiling point polymerization), emulsion polymerization, suspension polymerization, mass polymerization, living polymerization can be exemplified. Among them, the solution polymerization using neither a surfactant nor a dispersant is preferable.

A polymerization initiator to be used in the case of polymerization of the above-mentioned acrylic polymer is not particularly limited and for example, a peroxide type polymerization initiator and an azo type polymerization initiator are preferable.

As the above-mentioned polymerization initiator, those having a 10-hour half-life of 80° C. or lower so as to leave no volatile component of the polymerization initiator or its residue in the acrylic polymer to be obtained. A single polymerization initiator may be used or two or more types of polymerization initiators may be used in combination.

The above-mentioned peroxide type polymerization initiator is not particularly limited and examples of it are organic peroxides such as peroxycarbonate, ketone peroxide, peroxyketal, hydroperoxide, dialkyl peroxide, diacyl peroxide (lauroyl peroxide, benzoyl peroxide, 3,5,5-trimethylhexanoyl peroxide), and peroxy ester. Among them, peroxy esters with 8 or more carbon atoms of the acid residue and 6 or fewer carbon atoms of the alcohol residue are preferable in terms of odor suppression of the acrylic polymer to be obtained. Examples of the peroxy esters are tert-hexylperoxy-2-ethylhexanoate, tert-butylperoxy-2-ethylhexanoate, tert-butylperoxy-3,5,5-trimethylhexanoate, and tert-butylperoxylaurate.

Diacyl peroxide of which the acyl group is aliphatic with 8 or more carbon atoms is also preferable. Examples of such diacyl peroxide are lauroyl peroxide, 3,5,5-trimethylhexanoyl peroxide, octanoyl peroxide, and stearoyl peroxide.

The above-mentioned azo type polymerization initiator is not particularly limited and examples of it are azocompounds such as 2,2'-azobis(isobutyronitrile), 2,2'-azobis(2-methylbutyronitrile), 2,2'-azobis(2,4-dimethylvaleronitrile), and 2,2'-azobis(dimethylisobutyrate).

In the case of polymerization of the above-mentioned acrylic polymer, as the above-mentioned polymerization initiator, it is preferable to select those having a 10-hour half-life of 80° C. or lower so as to leave no volatile component of the polymerization initiator or its residue in the reaction solution and to carry out the reaction as long as possible, while keeping at the temperature higher than 10-hour half-life temperature as the polymerization condition. Further, in order to decrease the remaining polymerization initiator after polymerization and to promote the reaction quickly and completely, it is preferable to keep the polymerization temperature T in the final stage of the polymerization in a range satisfying the conditions defined by the following equation (5) and to keep the polymerization temperature for a long duration.

$$t_{1/2}+25 \geq T \geq t_{1/2}+5 \quad (5)$$

$t_{1/2}$ is 10-hour half-life temperature.

As the above-mentioned acrylic polymer, it is more preferable as the unreacted monomer, the unreacted polymerization initiator, or other impurities are less and at the time of polymerization or on completion of the polymerization, it is preferable to carry out operation for removing the unreacted monomer, the unreacted polymerization initiator, and other impurities.

The practical means for decreasing the remaining monomer in the above-mentioned polymerization step are, for example, a method for separating and removing the remaining monomer in a refluxing solvent in the terminal stage of the polymerization and a method for adding a scavenger monomer with a low boiling point and easy to be removed by reaction with the acrylic monomer or a modified vinyl monomer in the terminal stage of the polymerization.

The above-mentioned method for removing the remaining monomer from the polymerization system may include a method for replacing the refluxing solution of the polymerization solvent with a new solvent; a method for adding a scavenger monomer with a relatively low boiling point such as vinyl acetate, vinyl butyl ether, methyl acrylate, or styrene at the moment the polymerization degree reaches 95% or higher, preferably 98% or higher and then removing the remaining monomer with the scavenger monomer; and a method for washing the acrylic polymer with a poor solvent against the acrylic polymer, which is a low boiling point solvent such as methanol, ethanol, n-hexane, or n-heptane, on completion of the polymerization. These methods may be employed solely or two or more of the methods in combination.

The acrylic pressure sensitive adhesive of the invention may contain a tackifier for the purpose of improving the pressure sensitive adhesion physical properties. In the case of using the above-mentioned tackifier, the content of the component with a molecular weight of 600 or lower is preferably 13% by weight or lower. If such a tackifier is employed, the volatile component emitted from the tackifier can be suppressed without deteriorating the pressure sensitive adhesion physical properties, the pressure sensitive adhesion physical properties are improved, and the acrylic pressure sensitive adhesive with suppressed odor can be obtained. Further, the volatile component to be released in the case of heating acrylic pressure sensitive adhesive to be obtained at 120° C. for 30 minutes can be suppressed to 600 ppm or lower based on n-hexadecane and the amount of the volatile component which is a high boiling point component difficult to be removed by drying and has 30 minutes or longer retention time can be suppressed to 50 ppm or lower. The molecular weight and the content of the tackifier can be measured by GPC and calculated from the surface area ratio and the value obtained by conversion in to polystyrene.

Examples of the tackifier are rosin resins, rosin-modified phenol resins, disproportionation rosin ester resins, polymerized rosin esters, hydrogenated rosin ester resins, terpene phenol resins, cumarone indene resins, alkylphenol resin, and petroleum resins. Among them, alicyclic saturated hydrocarbon resins belonging to the rosin resins, polymerized rosin resins, and petroleum resins are preferable since they can remove the low molecular weight component.

The method for removing the component with a molecular weight of 600 or lower from the above-mentioned tackifier may include a method for heating and melting the tackifier at a softening point or higher and a method for blowing steam. In the case of the method for heating and melting the tackifier, in order to prevent oxidation reaction with oxygen in air, it is preferable to carry out heating in an inert gas such as nitrogen, helium or the like. Also, the heating time is preferably about 1 to 5 hours in order to avoid decomposition of the tackifier by the heating. In the case of blowing steam, if steam is blown after heating and melting of the tackifier followed by decrease of the tackifier to about 1 to 50 kPa, the volatile component can be decreased and the odor can be suppressed. The duration for blowing steam is preferably about 1 to 5 hours. If it is shorter than 1 hour, the effects to decrease the volatile gas and suppress the odor are insufficient and even if it is longer than 5 hours, the treatment effects are not so much improved.

The content of the above-mentioned tackifier is not particularly limited, and it is preferably 0.1 to 35% by weight to the acrylic polymer.

The acrylic pressure sensitive adhesive of the invention may contain a crosslinking agent. Addition of the crosslinking agent is effective to increase the agglomeration force since crosslinking structure of the polymer molecules or the polymer and the tackifier is formed by reaction of it with the functional group of the acrylic polymer or the tackifier. The above-mentioned crosslinking agent is not particularly limited and may include, for example, isocyanate type crosslinking agents, aziridine type crosslinking agents, epoxy type crosslinking agent, and metal chelating type crosslinking agent.

The acrylic pressure sensitive adhesive of the invention may further contain, on the basis of the necessity, additives such as a plasticizer, an emulsifier, a softening agent, a filler, a pigment and, a dye. It is preferable for them to be subjected similarly to proper removal of the volatile components as much as possible.

The acrylic pressure sensitive adhesive of the invention is suitable for a pressure sensitive adhesive layer of a pressure sensitive adhesive tape. The pressure sensitive adhesive tape having the pressure sensitive adhesive layer containing the acrylic pressure sensitive adhesive of the invention can be used preferably for adhesion and fixation of members to be used in a closed space of such as a vehicle, a housing and, in the inside of an electronic appliance, where odorous gases become a problem.

The third aspect of the present invention provides a pressure sensitive adhesive tape which has a pressure sensitive adhesive layer comprising the acrylic pressure sensitive adhesive of the first aspect of the present invention or the second aspect of the present invention, the pressure sensitive adhesive tape having 300 ppm or lower of volatile component concentration C calculated by the following equation (3), when the tape is heated at 90° C. for 30 minutes.

$$\text{volatile component concentration C (ppm)} = \text{volatile component content P (μg)/pressure sensitive adhesive weight R (g) before heating} \quad (3)$$

In the equation (3), the volatile component content P is an amount measured by conversion into toluene.

The fourth aspect of the present invention provides a pressure sensitive adhesive tape which has a pressure sensitive adhesive layer containing the acrylic pressure sensitive adhesive of the first aspect of the present invention or the second aspect of the present invention, the pressure sensitive adhesive tape having 400 ppm or lower of volatile component concentration D calculated by the following equation (4), when the tape is heated at 120° C. for 30 minutes.

$$\text{volatile component concentration D (ppm)} = \text{volatile component content Q (μg)/pressure sensitive adhesive weight R (g) before heating} \quad (4)$$

In the equation (4), the volatile component content Q is an amount measured by conversion into n-hexadecane.

The above-mentioned volatile component content P or volatile component content Q can be measured by the same method as the cases of the acrylic pressure sensitive adhesives of the first aspect of the present invention and the second aspect of the present invention.

The pressure sensitive adhesive tapes of the invention may comprise only the pressure sensitive adhesive layers containing the acrylic pressure sensitive adhesives of the invention or the above-mentioned pressure sensitive adhesive layers layered on one face or both faces of a substrate.

The substrate is not particularly limited and may include, for example, paper, non-woven fabrics, and sheet-like formed bodies made of polyesters, polyolefins, polyurethanes, polychloroprenes, vinyl chloride resin, and acrylic resins. Also, the above-mentioned substrate may be subjected to foaming treatment. The substrate is preferable for to be made of a previously refined material and to be subjected to the removal of the volatile components to satisfy the suppression of odor.

The production method of the pressure sensitive adhesive tape of the invention is not particularly limited and a conventionally known method can be employed. For example, a method for forming the pressure sensitive adhesive layer directly on the substrate; a method for forming the pressure sensitive adhesive layer on paper subjected to release treatment and then transferring the pressure sensitive adhesive on the process paper to the substrate can be exemplified.

As the method for forming the pressure sensitive adhesive layer, a method for applying the acrylic pressure sensitive adhesive of the invention in a prescribed thickness on the substrate or process paper and drying the solvent can be exemplified. At the time of drying the solvent, a method for increasing a drying temperature as high as possible to the extent that no foaming occurs in the substrate or the process paper, a method for prolonging the retention time in the drying furnace, a method for setting the drying furnace to be negative pressure, and a method for increasing the drying air blow amount can be employed, and accordingly, the volatile component concentration remaining in the pressure sensitive adhesive tapes of the invention can further be decreased. These methods may properly be selected and employed in combination. Also, in the case of curing and maintaining the pressure sensitive adhesive tapes of the invention, the volatile components can be suppressed by adjusting the curing temperature, decreasing the pressure in the curing atmosphere and accordingly the volatile component concentration can be decreased and the odor can be suppressed.

If the pressure sensitive adhesive tapes of the invention are used, an adhesive structure in which volatile gas emission attributed to the pressure sensitive adhesive tapes and affecting electronic appliances is scarcely caused and odor emission attributed to the pressure sensitive adhesive tapes is suppressed can be formed. The pressure sensitive adhesive tapes are particularly suitable for the use relevant to the automotive interiors where the spaces are narrow and odor becomes a problem and particularly a vehicular air conditioner unit produced by using the pressure sensitive adhesive tapes of the invention is remarkably improved in odor suppression as compared with those produced by using conventional pressure sensitive adhesive tapes.

Accordingly, a vehicular air conditioner unit which is obtainable by using the pressure sensitive adhesive tapes of the third aspect of the present invention or the fourth aspect of the present invention is also one of the present invention.

BEST MODE FOR CARRYING OUT THE INVENTION

Hereinafter, the invention will be described more in detail with reference to Examples, however the invention should not be limited to these Examples.

EXAMPLE 1

In a reaction container equipped with a thermometer, a starrier, a cooling pipe, a dropping funnel, and a nitrogen gas introduction pipe, a monomer mixture containing n-butyl acrylate 70 g, 2-ethylhexyl acrylate 27 g, acrylic acid 3 g, and 2-hydroxyethyl methacrylate 0.5 g was dissolved in ethyl acetate 83 g and at a refluxing point, as a polymerization initiator, lauroyl peroxide (10-hour half-life: 62° C.) 4 mmol was added properly from the starting of the polymerization for 4 hours to polymerize the acrylic monomers. After 4 hours, the polymerization initiator 2 mmol was properly added for 4 to 6 hours to decrease remaining monomers and after that, for further decreasing the remaining monomers and remaining initiator, the reaction was carried out further for 10 hours (the polymerization terminal stage). The obtained solution was cooled to produce an acrylic polymer solution.

The obtained acrylic polymer solution 100 g was mixed evenly with a functional isocyanate type crosslinking agent [Coronate L (active substance 55%), manufactured by Nippon Polyurethane Industry Co., Ltd.] 1.5 g to produce an acrylic pressure sensitive adhesive.

The obtained acrylic pressure sensitive adhesive was applied in a thickness of 60 μm after drying to one face of a separator of a 50 μm-thick polyethylene terephthalate film and dried for complete removal of the solvent at 120° C. for 5 minutes to produce a pressure sensitive adhesive tape.

EXAMPLE 2

An acrylic pressure sensitive adhesive and a pressure sensitive adhesive tape were produced in the same manner as Example 1, except that tert-hexylperoxy-2-ethylhexanoate (10-hour half-life: 70° C.) was used as the polymerization initiator.

EXAMPLE 3

An acrylic pressure sensitive adhesive and a pressure sensitive adhesive tape were produced in the same manner as Example 1, except that tert-butylperoxy-2-ethylhexanoate was used as the polymerization initiator.

EXAMPLE 4

An acrylic pressure sensitive adhesive and a pressure sensitive adhesive tape were produced in the same manner as Example 3, except that vinyl acetate monomer 5 g was added after 10 hours from reaction.

COMPARATIVE EXAMPLE 1

An acrylic pressure sensitive adhesive and a pressure sensitive adhesive tape were produced in the same manner as Example 1, except that benzoylperoxide (10-hour half-life: 74° C.) was used as the polymerization initiator.

EXAMPLE 5

A tackifier 25 g containing 9.4% by weight of a component with a molecular weight of 600 or lower was added to 100 g of the acrylic polymer produced in the same manner as Example 4 and evenly stirred and then an isocyanate type crosslinking agent [Coronate L (active substance 55%), manufactured by Nippon Polyurethane Industry Co., Ltd.] 1.5 parts by weight was added and the resulting mixture was again stirred evenly to produce an acrylic pressure sensitive adhesive.

The obtained acrylic pressure sensitive adhesive was applied in a thickness of 60 μm after drying to one face of a separator of a 50 μm-thick polyethylene terephthalate film and dried at 120° C. for 5 minutes to produce a pressure sensitive adhesive tape.

COMPARATIVE EXAMPLE 2

An acrylic pressure sensitive adhesive and a pressure sensitive adhesive tape were produced in the same manner as Example 5, except that a tackifier 25 g containing 15.6% by weight of a component with a molecular weight of 600 or lower was added.

EXAMPLE 6

An acrylic pressure sensitive adhesive and a pressure sensitive adhesive tape were produced in the same manner as Example 4, except that tert-butylperoxy-2-ethylhexanoate (10-hour half-life: 70° C.) 4 mmol was properly added as the polymerization initiator in a period of 4 hours from the starting and after 4 hours, 3,5,5-trimethylhexanoyl peroxide 2 mmol was further properly added for decreasing the remaining monomers.

EXAMPLE 7

An acrylic pressure sensitive adhesive and a pressure sensitive adhesive tape were produced in the same manner as Example 5, except that the acrylic polymer produced in Example 6 was used.

The acrylic pressure sensitive adhesives and pressure sensitive adhesive tapes produced in Examples 1 to 7 and Comparative Examples 1 and 2 were evaluated for odorous properties, cloud, volatile component concentrations, and physical properties by the following methods. The results are shown in Table 1.

(Evaluation of Odorous Properties)

Evaluation was carried out according to VDA 270. The evaluation was carried out by enclosing each pressure sensitive adhesive tape with 50 cm$^2$ size in a glass bottle of 1 L capacity, taking out the tape after keeping the tape at 40° C. atmosphere for 24 hours, and immediately subjecting the tape to the odorous properties evaluation based on the following 6-point method. At the sensory evaluation, three or more panelists evaluated each pressure sensitive adhesive tape according to the following 6-point method and the average values were calculated:
1: impossible to be sensed;
2: possible to be sensed but not offensive;
3: possible to be clearly sensed but not so much offensive;
4: offensive;
5: very offensive; and
6: not endurable (Evaluation of Cloud)

Evaluation was carried out by enclosing each pressure sensitive adhesive tape about 20 g in a glass bottle of 100 mL capacity, covering the bottle with a glass plate, heating at 120° C. for 24 hours, and observing the change of the glass plate. The determination criteria for the evaluation were as follows:
◯: no change observed;
Δ: a trace of fog observed; and
×: fog observed clearly.

(Measurement of the Volatile Component Concentrations)

The volatile component content was measured by heating a weighed pressure sensitive adhesive tape by a thermal sorption apparatus (ATD-400, manufactured by PerkinElmer Inc.) at the time when the tape was heated at 90° C. for 30 minutes and also at time when the tape was heated at 120° C. for 30 minutes and measuring the emitted volatile component contents by GC-MS apparatus (e.g. Automass II-15, manufactured by JEOL Ltd.) and, the volatile component concentration was calculated according to the above-mentioned equation (3) or (4). The volatile component concentration of each pressure sensitive adhesive was calculated according to the above-mentioned equation (1) or (2) from the pressure sensitive adhesive weight (the pressure sensitive adhesive weight=the pressure sensitive adhesive tape weight—the substrate PET weight) calculated by previously measuring the weight ratio of the substrate PET in the pressure sensitive adhesive tape and subtracting the substrate weight from the pressure sensitive adhesive tape weight. With respect to the PET substrate, it was previously confirmed that there was no volatile component for the measurement.

For GC-MS measurement, a non-polar capillary column (HP-1, manufactured by Agilent Technologies, 0.32 mm×60 m×0.25 μm) was used and in the case of heating at 90° C. for 30 minutes, the temperature of the column was kept at 40° C. for 4 minutes and then heated to 100° C. at 5° C./min heating rate and further to 320° C. at 10° C/min heating rate and kept at 320° C. for 3 minutes. Also in the case of heating at 120° C. for 30 minutes, the temperature of the column was kept at 50° C. for 2 minutes and then heated to 160° C. at 25° C./min heating rate and further to 300° C. at 10° C./min heating rate and kept at the temperature for 20 minutes.

The MS measurement range was 30 to 400 amu, the He flow rate was 1.5 mL/min, the ionization voltage was 70 eV, the ion source was kept at 230° C., the interface at 250° C., and the transfer line at 225° C. The volatile component concentration was calculated from the obtained peak surface area by weight conversion based on an absolute calibration curve produced by using toluene or n-hexadecane.

The remaining polymerization initiator total amount and the remaining acrylic monomer total amount after heating at 90° C. for 30 minutes and the volatile component content after 30 minutes or longer retention time were also measured.

(Evaluation of Physical Properties)

The adhesion of each of the obtained pressure sensitive adhesive tapes was measured according to JIS Z0237.

TABLE 1

| | after 30 minutes at 90° C. (ppm) | | | | | after 30 minutes at 120° C. (ppm) | | | | |
|---|---|---|---|---|---|---|---|---|---|---|
| | pressure sensitive adhesive volatile component concentration A | pressure sensitive adhesive tape | | | | pressure sensitive adhesive volatile component concentration B | pressure sensitive adhesive tape volatile component concentration D | odor | cloud | adhesion against peeling from SUS at 180° C. (N/25 mm) |
| | | volatile component concentration C | component content after 30 minutes or longer retention time | remaining polymerization initiator amount | total remaining monomer amount | | | | | |
| Example 1 | 135 | 90 | 16 | 26 | 15 | 120 | 80 | 3.2 | ◯ | 9.5 |
| Example 2 | 116 | 77 | 18 | 20 | 20 | 111 | 74 | 2.6 | ◯ | 9.7 |
| Example 3 | 113 | 75 | 17 | 17 | 21 | 110 | 73 | 2.6 | ◯ | 9.3 |
| Example 4 | 98 | 65 | 15 | 15 | 10 | 105 | 70 | 2.5 | ◯ | 9.7 |
| Example 5 | 330 | 220 | 33 | 14 | 11 | 357 | 238 | 2.7 | ◯ | 17.2 |
| Example 6 | 78 | 52 | 13 | 13 | 10 | 95 | 63 | 1.5 | ◯ | 9.6 |
| Exemple 7 | 315 | 210 | 37 | 10 | 8 | 353 | 235 | 2.3 | ◯ | 18.1 |
| Comparative Example 1 | 533 | 355 | 38 | 63 | 160 | 674 | 449 | 5.5 | Δ | 9.9 |
| Comparative Example 2 | 960 | 640 | 478 | 14 | 10 | 1575 | 1050 | 5.0 | Δ | 16.5 |

INDUSTRIAL APPLICABILITY

The invention provides an acrylic pressure sensitive adhesive and a pressure sensitive adhesive tape preferable to be used for adhesion and fixation of members to be used in closed space of such as a vehicle, a housing where odor become a problem; or in the inside of electronic appliances where volatile gases become a problem and also provides a vehicular air conditioner unit produced by using them.

The invention claimed is:

1. An acrylic pressure sensitive adhesive containing an acrylic polymer and a tackifier, wherein the acrylic polymer is polymerized with a polymerization initiator having a 10-hour half-life at 80° C. or lower and under a polymerizing condition carrying out the reaction while keeping at the temperature higher than 10-hour half-life temperature and keeping the polymerization temperature T in the final stage of the polymerization in a range satisfying the condition defined by the following equation 5, wherein the tackifier contains 13% by weight or lower of a component with 600 or lower molecular weight, which has 500 ppm or lower of volatile component concentration A calculated by the following equation (1), when the acrylic pressure sensitive adhesive is heated at 90° C. for 30 minutes:

volatile component concentration A (ppm)=volatile component content X (μg)/pressure sensitive adhesive weight Z (g) before heating    (1)

in the equation (1), the volatile component content X is an amount measured by conversion into toluene $$t\frac{1}{2}+25 \geq T \geq t\frac{1}{2}+5 \quad (5)$$

wherein t½ is 10-hour half-life temperature.

2. An acrylic pressure sensitive adhesive containing an acrylic polymer and a tackifier, wherein the acrylic polymer is polymerized with a polymerization initiator having a 10-hour half-life at 80° C. or lower and under polymerizing condition carrying out the reaction while keeping at the temperature higher than 10-hour half-life temperature and keeping the polymerization temperature T in the final stage of the polymerization in a range satisfying the conditions defined by the following equation (5), wherein the tackifier contains 13% by weight or lower of a component with 600 or lower molecular weight, which has 600 ppm or lower of volatile component concentration B calculated by to the following equation (2), when the acrylic pressure sensitive adhesive is heated at 120° C. for 30 minutes:

volatile component concentration B (ppm)=volatile component content Y (μg)/pressure sensitive adhesive weight Z (g) before heating    (2)

in the equation (2), the volatile component content Y is an amount measured by conversion into n-hexadecane $$t\frac{1}{2}+25 \geq T \geq t\frac{1}{2}+5 \quad (5)$$

wherein t½ is 10-hour half-life temperature.

3. A pressure sensitive adhesive tape, which has a pressure sensitive adhesive layer comprising the acrylic pressure sensitive adhesive according to claim 1, the pressure sensitive adhesive tape having 300 ppm or lower of volatile component concentration C calculated by the following equation (3), when the pressure sensitive adhesive tape is heated at 90° C. for 30 minutes:

volatile component concentration C (ppm)=volatile component content P (μg)/pressure sensitive adhesive tape weight R (g) before heating    (3)

in the equation (3), the volatile component content P is an amount measured by conversion into toluene.

4. A pressure sensitive adhesive tape, which has a pressure sensitive adhesive layer comprising the acrylic pressure sensitive adhesive according to claim 2, the pressure sensitive adhesive tape having 400 ppm or lower of volatile component concentration D calculated by the following equation (4), when the pressure sensitive adhesive tape is heated at 120° C. for 30 minutes:

volatile component concentration D (ppm)=volatile component content Q (μg)/pressure sensitive adhesive tape weight R (g) before heating    (4)

in the equation (4), the volatile component content Q is an amount measured by conversion into n-hexadecane.

5. A vehicular air conditioner unit, which is fixed by the pressure sensitive adhesive tape according to claim 3.

6. A pressure sensitive adhesive tape, which has a pressure sensitive adhesive layer comprising the acrylic pressure sensitive adhesive according to claim 1, the pressure sensitive adhesive tape having 300 ppm or lower of volatile component concentration C calculated by the following equation (3), when the pressure sensitive adhesive tape is heated at 90° C. for 30 minutes:

volatile component concentration C (ppm)=volatile component content P (μg)/pressure sensitive adhesive tape weight R (g) before heating    (3)

in the equation (3), the volatile component content P is an amount measured by conversion into toluene.

7. A pressure sensitive adhesive tape, which has a pressure sensitive adhesive layer comprising the acrylic pressure sensitive adhesive according to claim 2, the pressure sensitive adhesive tape having 400 ppm or lower of volatile component concentration D calculated by the following equation (4), when the pressure sensitive adhesive tape is heated at 120° C. for 30 minutes:

volatile component concentration D (ppm)=volatile component content Q (μg)/pressure sensitive adhesive tape weight R (g) before heating    (4)

in the equation (4), the volatile component content Q is an amount measured by conversion into n-hexadecane.

8. A vehicular air conditioner unit, which has adhered thereto the pressure sensitive adhesive tape according to claim 4.

9. A vehicular air conditioner unit, which has adhered thereto the pressure sensitive adhesive tape according to claim 6.

10. A vehicular air conditioner unit, which has adhered thereto the pressure sensitive adhesive tape according to claim 7.

* * * * *